Sept. 23, 1947.  L. A. LEHRMAN ET AL  2,427,864
SPRING GROUP
Filed Nov. 18, 1942  4 Sheets-Sheet 1

INVENTORS.
Leo A. Lehrman
and Fred E. Bachman,
Orrin O. B. Garner
Atty.

Sept. 23, 1947. L. A. LEHRMAN ET AL 2,427,864
SPRING GROUP
Filed Nov. 18, 1942 4 Sheets-Sheet 2
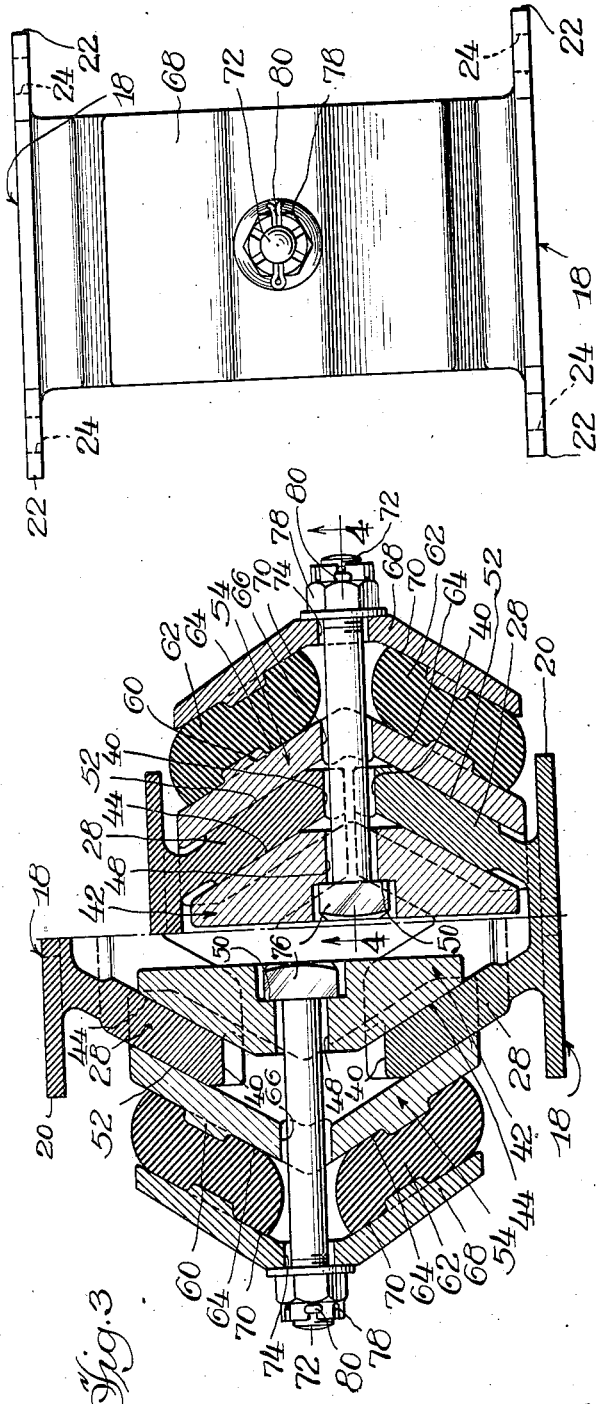
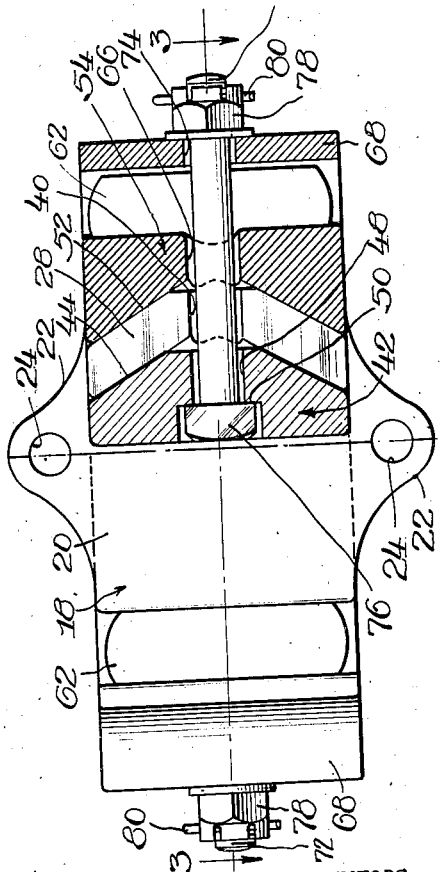
INVENTORS.
Leo A. Lehrman
and Fred E. Bachman,
Atty Sept. 23, 1947.  L. A. LEHRMAN ET AL  2,427,864
SPRING GROUP
Filed Nov. 18, 1942  4 Sheets-Sheet 3
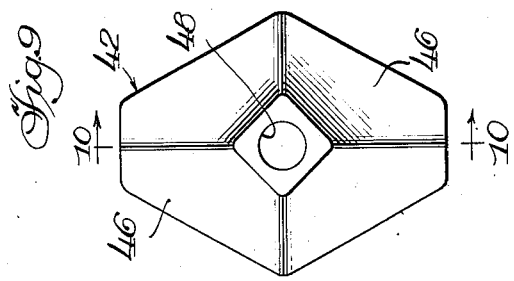
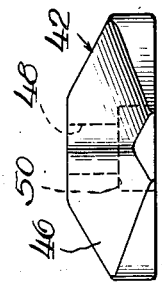
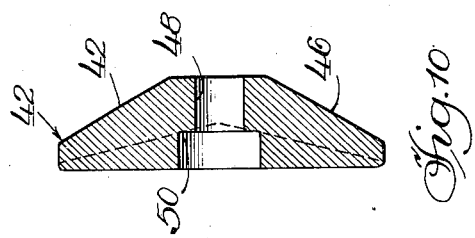
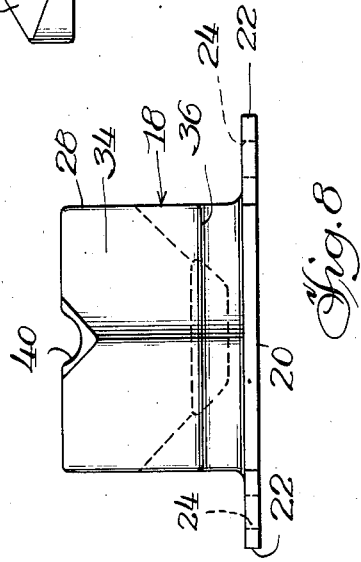
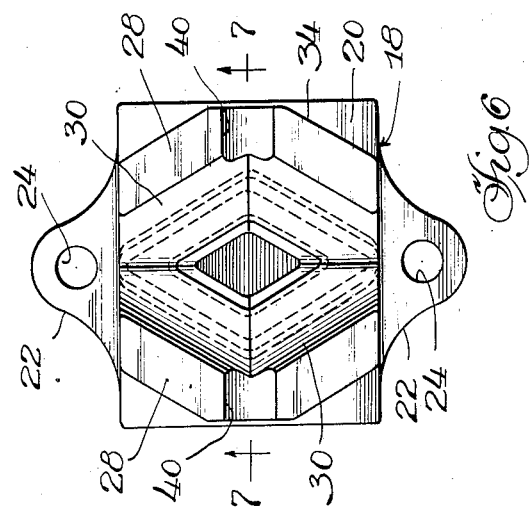
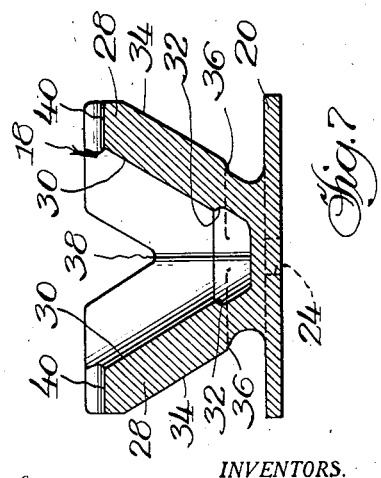
INVENTORS.
Leo A. Lehrman
and Fred E. Bachman,
Atty.

Sept. 23, 1947. L. A. LEHRMAN ET AL 2,427,864
SPRING GROUP
Filed Nov. 18, 1942 4 Sheets-Sheet 4
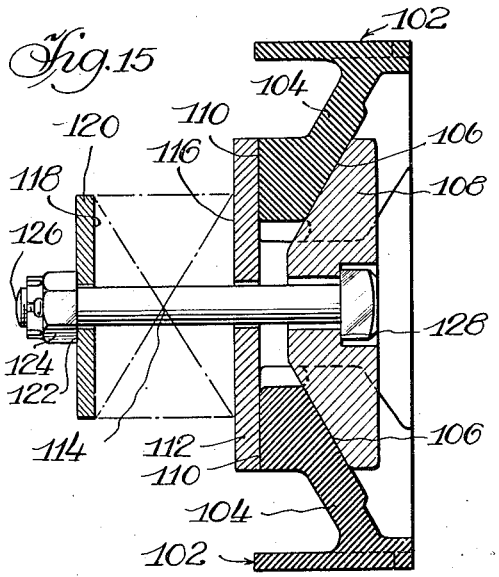
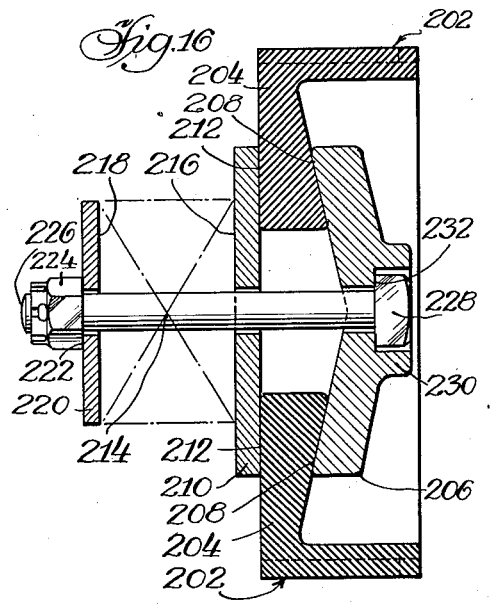
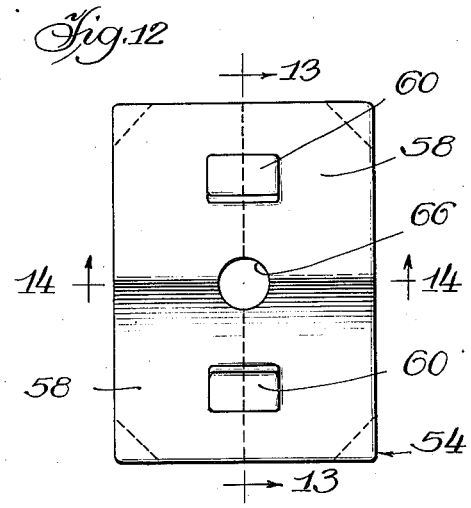
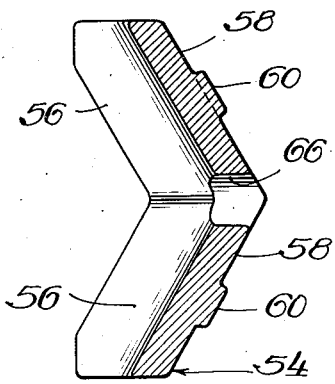
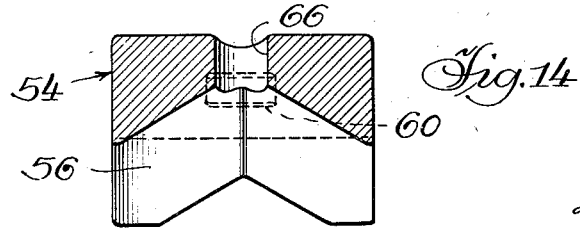
INVENTORS.
Leo A. Lehrman
and Fred E. Bachman Patented Sept. 23, 1947

2,427,864

UNITED STATES PATENT OFFICE 2,427,864

SPRING GROUP

Leo A. Lehrman and Fred E. Bachman, Chicago, Ill., assignors to American Steel Foundries, Chicago, Ill., a corporation of New Jersey Application November 18, 1942, Serial No. 465,958

25 Claims. (Cl. 267—9)

Our invention relates to friction absorbing devices and more particularly to such a device utilized in conjunction with a group or nest of coil springs and serving to dampen the oscillations thereof in order to substantially eliminate harmonious vibrations or oscillations of said springs.

Our novel friction absorbing device is here shown in conjunction with a coil spring group designed to afford support for the bolster member of a railway car truck, but it will be readily apparent that our device may be utilized for any analogous purpose to which it may be suited.

A specific object of our invention is to design a device such as above described in which spaced followers each present opposed walls having inner and outer friction surfaces engaged respectively by inner and outer friction shoes.

A further object of our invention is the provision of a resilient actuating means abutting the outer face of each outer shoe and reacting against the associated inner shoe whereby the interposed walls of the followers are clamped between said inner and outer shoes.

Still another object of our invention is to design a novel friction follower comprising a base web and spaced diagonal walls integrally formed with said web and converging adjacent their juncture therewith, each of said walls presenting an inner and an outer friction surface.

A further object of our invention is to design a novel friction shoe presenting on one face thereof oppositely directed diagonal friction surfaces and on the opposite face thereof oppositely directed diagonal spring seats.

A still further object of our invention is to design another friction shoe of novel form having spaced friction surfaces on one face thereof and a passage extending therethrough and between said surfaces.

Another object of our invention is to design a novel spring cap comprising on one face thereof oppositely directed diagonal seats for associated resilient members and also comprising a passage extending through said cap, between said seats, and adapted for the reception of an associated securing member.

In the drawings:

Figure 3 is an enlarged sectional view of our novel friction absorbing device, taken substantially in the vertical plane bisecting said device longitudinally thereof as indicated by the line 3—3 of Figure 4, the left half of Figure 3 showing our device in released position, and the right half thereof showing the device in closed position.

Figure 4 is a bottom view of the structure shown in Figure 3, the left half thereof being a plan view, and the right half thereof being a sectional view taken in the horizontal plane indicated by the line 4—4 of Figure 3, and Figure 5 is an end view of the device shown in released position.

Figures 6 to 8 inclusive show our novel form of follower, Figure 6 being a plan view thereof, Figure 7 being a sectional view taken in the plane indicated by the line 7—7 of Figure 6, and Figure 8 being an end elevation taken from the right as seen in Figure 6.

Figures 9 to 11 inclusive show our novel form of inner friction shoe, Figure 9 being a side elevation taken from the follower engaging face thereof, Figure 10 being a sectional view taken substantially in the plane indicated by the line 10—10 of Figure 9, and Figure 11 being a plan view taken from the bottom as seen in Figure 9.

Figures 12 to 14 inclusive show our novel form of outer friction shoe, Figure 12 being a side elevation taken from the spring engaging face thereof, Figure 13 being a sectional view taken approximately in the plane indicated by the line 13—13 of Figure 12, and Figure 14 being a further sectional view taken approximately in the plane indicated by the line 14—14 of Figure 12.

Figures 15 and 16 are fragmentary sectional views corresponding to the left half of Figure 3 and each showing a modification of our novel friction absorbing device.

Figure 1:
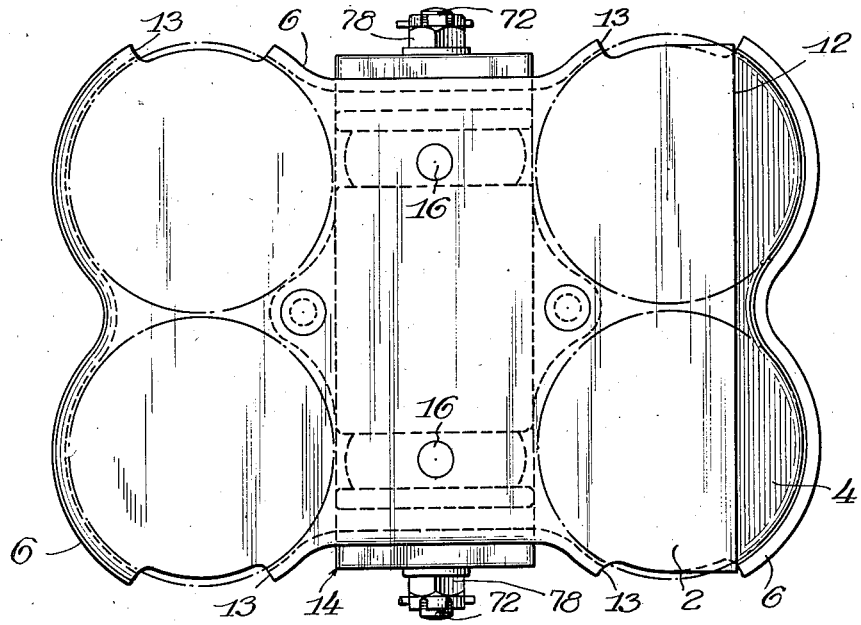
Figure 1 is a top plan view of our novel friction absorbing device shown in conjunction with a coil spring group.
Figure 2:
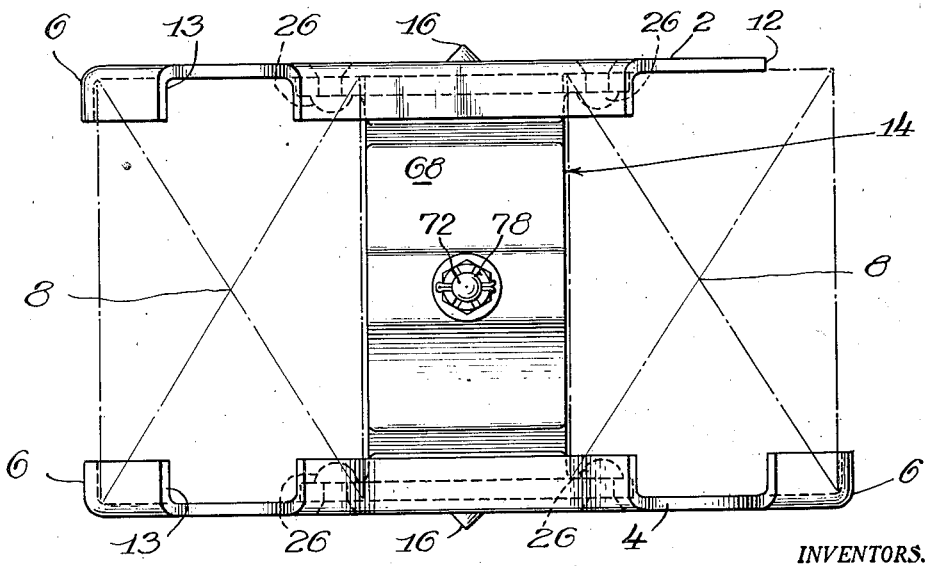
Figure 2 is a side elevation taken from the bottom as seen in Figure 1.

Describing our invention in detail and referring first to the modification shown in Figures 1 to 14 inclusive, the spring group shown in Figures 1 and 2 comprises top and bottom spring plates 2 and 4, each being flanged as at 6, 6 to afford convenient positioning means for the coil springs 8, 8 diagrammatically indicated and interposed between the top and bottom plates 2 and 4. It may be noted that the inboard edge of the top plate is cut off at 12 to avoid interference with the supported bolster member, and the flanges 6, 6 are discontinuous at 13, 13 to permit escape of extraneous material from the spring group. As here illustrated, the spring group comprises inboard and outboard pairs of coil springs 8, 8 with our novel friction device generally designated 14 (Figures 1 and 2) interposed between said pairs, but it will be readily understood by those skilled in the art that any desired number of springs 8, 8 may be utilized at one or both sides of the device 14. It may be noted that each spring plate 2 and 4 is formed with positioning means in the forms of lugs 16, 16 adapted to be received within complementary recesses in the associated supporting and supported members.

Our novel friction absorbing device 14 is shown in detail in Figures 3 to 5 inclusive and comprises spaced identical top and bottom followers generally designated 18, 18, one of said followers being shown in detail in Figures 6 to 8 inclusive. Each follower 18 comprises a base web 20 preferably formed with ears 22, 22 at opposite sides thereof, said ears being perforated at 24, 24 for the accommodation of rivets 26, 26 (Figure 2) securing the follower to the associated spring plate; however it will be readily understood by those skilled in the art that if desired the follower 18 may be secured in any desired manner as by welding to the associated plate. Formed on the base web 20 are opposed diagonally arranged V-shaped walls 28, 28 each having an inner friction surface 30 relieved as at 32 to prevent wearing of a shoulder thereon, and each of said walls 28, 28 comprises an outer friction surface 34 relieved as at 36 to prevent wearing of a shoulder thereon, the walls 28, 28 merging as at 38 (Figure 7) and each being afforded a recess or slot 40 on the edge thereof remote from the base web 20, said slot serving a purpose hereinafter more fully described.

It will be understood that the form of the diagonal friction surfaces 30 and 34, while here shown as V-shaped, may if desired, be arcuate or even flat without departing from the scope of this invention.

A pair of identical inner friction shoes generally designated 42, 42 engage the inner surfaces 30, 30 on the respective followers as at 44 (Figures 3 and 4), one of said shoes being shown in detail in Figures 9 to 11 inclusive, said shoe being a solid metallic member having on one side thereof top and bottom diagonal V-shaped friction faces 46, 46 for engagement at 44 with the complementary inner surfaces 30, 30 on the top and bottom followers. Extending through the shoe 42 and between the faces 46, 46 is a passage 48 offset to form a shoulder 50 affording a seat as hereinafter more fully described, for an associated securing member.

In engagement at 52, 52 with the outer surfaces 34, 34 on the followers 2 and 4 are a pair of outer friction shoes generally designated 54, 54, one of said shoes being shown in detail in Figures 12 to 14 inclusive and comprising on one side thereof top and bottom V-shaped friction faces 56, 56 for engagement as above described at 52, 52 with the associated outer surfaces 34, 34 on the top and bottom followers. On the opposite face of the shoe 54 are the oppositely directed diagonal spring seats 58, 58 provided with spring positioning lugs 60, 60 recessed in the associated resilient pads 62, 62 abutting the seats 58, 58 as at 64, 64 (Figure 3). Extending through each shoe 54 between the faces 56, 56 thereon and the spring seats 58, 58 is a passage 66, adapted for the reception of an associated securing member as hereinafter more fully described.

A spring cap 68 is seated at 70, 70 (Figure 3) along oppositely directed diagonal surfaces against the pads 62, 62 associated with each outer shoe 54, and a bolt 72 extends through an opening 74 in said cap, between the associated pads 62, 62, and through the passages 66 and 48 in the associated outer and inner shoes respectively, said bolt comprising a head 76 seated against the shoulder 50 of the passage 48 through the inner shoe, as will be clearly apparent from a consideration of Figures 3 and 4, and it will be clearly understood from consideration of the right half of Figure 3 that on the compression stroke, the friction walls 28, 28 of the top and bottom followers 18, 18 are afforded clearance from the bolt 72 by means of the passages or recesses 40, 40 in said walls.

It will be understood that, although in the modification shown each outer shoe 54 is actuated by means of a plurality of pads 62, 62, if desired a single pad may be employed with an opening therethrough for the accommodation of the bolt 72 or, as hereinafter discussed in connection with the modification shown in Figures 15 and 16, a single coil spring sleeved over the bolt 72 may be utilized.

A nut 78 is threaded on the outer end of each bolt 72 and is secured by means of a cotter pin 80 or other convenient means preventing accidental rotation thereof, and it will be readily understood that by means of the nut 78, the associated resilient means 62 may be adjustably compressed between the outer shoe 54 and the spring cap 68, thereby adjusting the amount of friction developed by the device.

A different modification of our novel friction absorbing device is shown in Figure 15, a fragmentary sectional view comparable to the left half of Figure 3, and in this modification identical top and bottom followers 102, 102 comprise at opposite sides thereof the friction walls 104, 104, each of said walls being in complementary diagonal V-shaped face engagement at 106 with an associated inner friction shoe 108, and each of the walls 104 being in substantially vertical flat face engagement as at 110 with an outer friction shoe or plate 112, the walls 104, 104 being clamped between the inner and outer shoes 108 and 112 by means of a coil spring diagrammatically indicated at 114 and seated at 116 against the outer shoe 112, said spring being seated at the opposite end thereof as at 118 against a spring plate 120 engaging as at 122 a nut 124 threaded on the end of a bolt 126 extending through aligned openings in the spring plate 120, the outer shoe 112, and the inner shoe 108 and seated as at 128 against a shoulder on the passage through the inner shoe substantially as described for the previous modification.

It will be understood that the modification shown in Figure 15 is substantially identical with with that disclosed in the previous figures except for the fact that the friction walls of the top and bottom followers engage the outer friction shoes along substantially flat vertical surfaces and a single coil spring 114 is utilized instead of the plurality of resilient means shown in the previous modification.

Figure 16 is a view comparable to that of Figure 15 and shows still another modification of our novel friction absorbing device in which identical top and bottom followers 202, 202 comprise at opposite sides thereof the friction walls 204, 204, corresponding walls engaging an inner friction shoe 206 along complementary diagonal surfaces as 208, 208, and the walls 204, 204 engage an outer friction shoe or plate 210 along substantially flat vertical friction surfaces as at 212, 212, the walls 204, 204 being clamped between the inner and outer shoes 206 and 210 by means of a coil spring 214 seated as at 216 against the outer shoe 210 and seated as at 218 against a spring plate 220 abutting at 222 a nut 224 threaded on the outer end of a bolt 226 extending through the spring 214 and through aligned openings in the spring plate 220, the outer friction shoe 210, and the inner friction shoe 206, said bolt being provided with a head 228 recessed in a boss 230 on the inner face of the friction shoe 206 and seated as at 232 against a shoulder in the passage through said shoe.

It will be understood that the modifications shown in Figures 15 and 16 are substantially identical except for the fact that the diagonal face engagement between the inner shoes and the followers is reversely arranged in the respective modifications, whereby in the modification shown in Figure 15 greater friction absorption is obtained on the compression stroke, and in the modification shown in Figure 16 greater friction absorption is obtained on the release stroke, as will be clearly apparent to those skilled in the art.

It will be further understood that if desired the engagement between the friction followers and the inner and outer shoes may be along parallel vertical friction surfaces in order to obtain substantially uniform friction absorption on the compression and release strokes of the device.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a spring group, top and bottom spring plates, spaced followers secured to respective plates and each comprising at opposite sides thereof diagonal walls having inner and outer V-shaped friction surfaces, inner friction shoes each engaging an inner surface on each follower, outer friction shoes each engaging an outer surface on each follower, spaced resilient means seated against respective outer shoes, spring caps on respective resilient means, and rigid means associated with each cap, extending through an opening in the associated outer shoe, and slidably interlocked at opposite ends thereof with said cap and the associated inner shoe.

2. In a spring group, spaced spring plates with a coil spring therebetween, friction followers secured to respective plates, each of said followers having at opposite sides thereof diagonal friction elements each presenting nonflat inner and outer friction surfaces, inner friction shoes each engaging an inner surface on each follower, outer friction shoes each engaging an outer surface on each follower, spaced resilient means seated against respective outer shoes, a spring cap on the means associated with each outer shoe, and means connecting each cap with the associated inner shoe, said connecting means extending through an opening in the associated outer shoe.

3. In a spring group, spaced spring plates with a coil spring therebetween, friction followers secured to respective plates, each of said followers having at opposite sides thereof diagonal friction elements each presenting nonflat inner and outer friction surfaces, inner friction shoes each engaging an inner surface on each follower, outer friction shoes each engaging an outer surface on each follower, spaced resilent means seated against respective outer shoes, a spring cap on the means associated with each outer shoe, and means connecting each cap with the associated inner shoe.

4. In a spring group, top and bottom spring plates, spaced followers secured to respective plates and each comprising at opposite sides thereof diagonal walls having inner and outer V-shaped friction surfaces, inner friction shoes each engaging an inner surface on each follower, outer friction shoes each engaging an outer surface on each follower, spaced resilient means seated against each outer shoe along oppositely directed diagonal surfaces, a spring cap on said means, and securing means extending through an opening in said outer shoe and slidably interlocked at opposite ends thereof with said cap and the associated inner shoe.

5. In a friction absorbing device, spaced followers each presenting opposed walls, friction elements clamping corresponding walls therebetween, each of said elements frictionally engaging a wall on each follower, resilient means adjacent each wall and seated against one of the friction elements associated therewith, means connecting said resilient means to the other element associated with said wall whereby the same is clamped between its associated elements, and resilient means engaging spring abutment means fixed to respective followers for yieldingly resisting movement of said followers toward each other.

6. In a friction absorbing device, spaced followers each presenting opposed walls, friction elements clamping corresponding walls therebetween, resilient means adjacent each wall and seated against certain of the friction elements associated therewith, means connecting said resilient means to the other of the elements associated with said wall whereby the same is clamped between its associated elements, and resilient means for yieldingly resisting movement of said followers toward each other, said last-mentioned resilient means reacting against abutment means fixed to the respective followers.

7. In a friction absorbing device, spaced followers each comprising spaced opposed walls, inner and outer friction shoes at opposite sides of each wall and each shoe having engagement with a wall on each follower, rigid members each extending through one of said inner shoes and one of said outer shoes and connected to said inner shoes, and resilient means compressed between each outer shoe and abutment means on the member associated therewith.

8. In a friction absorbing device, spaced followers comprising friction housings each presenting opposed walls, a pair of friction shoes within said housings and each engaging a wall of each housing, a pair of friction shoes disposed exteriorly of said housings and each engaging an adjacent wall of each housing, rigid members each extending through a shoe of each pair and connected to one of said shoes, and resilient means compressed between the other shoe of each pair and abutment means on the associated member.

9. In a friction absorbing device, spaced followers each comprising a base affording a seat for one end of the device, spaced walls projecting from each base and each having inner and outer friction surfaces, one of said surfaces being diagonal with respect to said base and the other of said surfaces being substantially perpendicular with respect to said base, friction shoes each engaging an inner surface on each follower, other friction shoes each engaging an outer surface on each follower, resilient means compressed against the outer shoes, rigid members disposed between said walls and each extending through an outer shoe and connected to an inner shoe and to said resilient means, and resilient means for resisting movement of the followers toward each other, said last-mentioned resilient means engaging abutment means fixed to the bases of the respective followers.

10. In a friction absorbing device, spaced followers each comprising a base affording a seat for one end of the device, spaced walls projecting diagonally from each base and each having inner and outer friction surfaces, friction shoes each being seated against an inner surface on each follower, other shoes each being seated against an outer surface on each follower and cooperating with said first-mentioned shoes for clamping said walls therebetween, resilient means adjacent each wall and seated against one of the shoes associated therewith, means extending between said followers and connecting said resilient means to the other shoe associated with said wall whereby the same is clamped between said shoes, and resilient means reacting against abutment means fixed to respective followers for yieldingly resisting movement of said followers toward each other.

11. In a friction absorbing device, spaced followers having bases affording seats for opposite ends of the device against associated supporting and supported members, oppositely spaced walls on each follower presenting inner and outer friction faces, friction elements each engaging an inner face of each follower, other friction elements each engaging an outer face of each follower, resilient means operatively associated with said elements for urging the same into engagement with said faces, and independent resilient means engaging abutment means fixed to respective followers.

12. In a friction absorbing device, spaced followers having bases affording seats for opposite ends of the device against associated supporting and supported members, oppositely spaced walls on each follower presenting inner and outer friction faces, friction elements each engaging an inner face of each follower, other friction elements each engaging an outer face of each follower, resilient means operatively associated with said elements for urging the same into engagement with said faces, and independent resilient means engaging abutment means fixed to respective followers, said faces and the abutting surfaces of said elements being V-shaped in form.

13. In a friction follower, a member comprising a base web, and spaced diagonal walls on said web converging adjacent their juncture therewith, each of said walls presenting an inner and an outer V-shaped friction surface.

14. In a friction follower, a member comprising a base web, and spaced diagonal walls on said web converging adjacent their juncture therewith, each of said walls presenting substantially parallel friction surfaces on the inner and outer sides thereof, said surfaces being diagonal with respect to said web.

15. In a friction absorbing device, spaced followers having base webs affording seats for opposite ends of the device against associated supporting and supported members, oppositely spaced walls on each follower projecting from the base web thereof, each wall presenting substantially parallel inner and outer friction faces, friction elements each engaging an inner face of each follower, other friction elements each engaging an outer face of each follower, resilient means operatively associated with said elements for urging the same into engagement with said faces, and independent resilient means engaging abutment means fixed to respective followers.

16. In a friction absorbing device, spaced followers having base webs affording seats for the opposite ends of the device against associated supporting and supported members, oppositely spaced walls projecting from the base web of each follower, each wall presenting inner and outer friction faces, friction elements each engaging an inner face of each follower, other friction elements each engaging an outer face of each follower, resilient means operatively associated with said elements for urging the same into engagement with said faces, and independent resilient means engaging abutment means fixed to respective followers, the inner and outer faces on each wall converging toward the associated base web.

17. In a friction absorbing device, spaced followers having base webs affording seats for the opposite ends of the device against associated supporting and supported members, oppositely spaced walls projecting from the base web of each follower, each wall presenting inner and outer friction faces, friction elements each engaging an inner face of each follower, other friction elements each engaging an outer face of each follower, resilient means operatively associated with said elements for urging the same into engagement with said faces, and independent resilient means engaging abutment means fixed to respective followers, the inner and outer faces on each wall diverging toward the associated base web.

18. In a composite spring group, spaced spring plates, a spring extending therebetween, spaced followers fixed to respective plates, each of said followers comprising opposed walls each having inner and outer friction faces, inner friction elements each engaging an inner face on a wall of each follower, outer friction elements each engaging an outer face of a wall of each follower, resilient means compressed against said outer elements, spring caps on said resilient means, and rigid means connecting said caps with the associated inner elements.

19. In a composite spring group, spaced spring plates, a spring extending therebetween, spaced followers fixed to respective plates, each of said followers comprising opposed walls each having inner and outer friction faces, inner friction elements each engaging an inner face on a wall of each follower, outer friction elements each engaging an outer face of a wall of each follower, resilient means compressed against said outer elements, spring caps on said resilient means, and rigid means connecting said caps with the associated inner elements, said faces and the abutting surfaces of said elements being of complementary V-shape.

20. In a composite spring group, spaced spring plates, a spring extending therebetween, spaced followers fixed to respective plates, each of said followers comprising opposed walls each having inner and outer friction faces, inner friction elements each engaging an inner face on a wall of each follower, outer friction elements each engaging an outer face of a wall of each follower, resilient means compressed against said outer elements, spring caps on said resilient means, and rigid means connecting said caps with the associated inner elements, said faces and the abutting surfaces of said elements lying in planes diagonal with respect to said bases and being V-shaped in form.

21. In a composite spring group, spaced spring plates, a spring extending therebetween, spaced followers fixed to respective plates, each of said followers comprising opposed walls each having inner and outer friction faces, inner friction elements each engaging an inner face on a wall of each follower, outer friction elements each engaging an outer face of a wall of each follower, resilient means compressed against said outer elements, spring caps on said resilient means, and rigid means connecting said caps with the associated inner elements, the inner and outer faces of each wall converging toward the associated base.

22. In a composite spring group, spaced spring plates, a spring extending therebetween, spaced followers fixed to respective plates, each of said followers comprising opposed walls each having inner and outer friction faces, inner friction elements each engaging an inner face on a wall of each follower, outer friction elements each engaging an outer face of a wall of each follower, resilient means compressed against said outer elements, spring caps on said resilient means, and rigid means connecting said caps with the associated inner elements, the inner and outer faces of each wall diverging toward the associated base.

23. In a composite spring group, spaced spring plates, a spring extending therebetween, spaced followers fixed to respective plates, each of said followers comprising opposed walls each having inner and outer friction faces, inner friction elements each engaging an inner face on a wall of each follower, outer friction elements each engaging an outer face of a wall of each follower, resilient means compressed against said outer elements, spring caps on said resilient means, and rigid means connecting said caps with the associated inner elements, the walls of respective followers being relieved on their adjacent edges to afford clearance for said rigid means.

24. In a friction device, spaced followers having base webs affording seats for opposite ends of the device, oppositely spaced walls on each follower, each wall having friction faces on opposite sides thereof, friction elements on opposite sides of each wall and in engagement with the faces on said walls, resilient means compressed against the element at one side of said walls, spring abutment means bearing against said resilient means, and a rigid member connected to said abutment means, said member extending between said walls and being connected to the element at the opposite side thereof, and a spring bearing at opposite ends thereof against abutment means fixed to the base webs of respective followers.

25. In a friction device, spaced followers having base webs affording seats for the device against associated members, spaced opposed walls on the base web of each follower, each wall having friction faces on the opposite sides thereof, friction elements on opposite sides of each wall and in engagement with the faces on said walls, means including a resilient element under compression and operatively associated with the elements at opposite sides of said walls for urging said elements into engagement with said walls whereby said walls are clamped between said elements, and a spring bearing against abutment means fixed to the base webs of respective followers.

LEO A. LEHRMAN.
FRED E. BACHMAN.

REFERENCES CITED

The following references are of record in the file of this patent:

UNITED STATES PATENTS

| Number | Name | Date |
|---|---|---|
| 2,084,637 | Goodwin | June 22, 1937 |
| 2,084,638 | Goodwin | June 22, 1937 |
| 2,210,840 | Oelkers | Aug. 6, 1940 |
| 1,589,420 | O'Connor | June 22, 1926 |
| 2,065,992 | Barrett | Dec. 29, 1936 |
| 2,206,487 | O'Connor | July 2, 1940 |
| 1,382,222 | O'Connor | June 21, 1921 |
| 927,810 | Murray | July 13, 1909 |
| 1,510,332 | O'Connor | Sept. 30, 1924 |
| 751,943 | Ritter | Feb. 9, 1904 |
| 1,694,987 | Sherman et al. | Dec. 11, 1928 |

FOREIGN PATENTS

| Number | Country | Date |
|---|---|---|
| 470,162 | Great Britain | Aug. 10, 1937 |